United States Patent [19]
Matejic

[11] Patent Number: 5,430,392
[45] Date of Patent: Jul. 4, 1995

[54] CLOCK SYSTEM AND METHOD FOR REDUCING THE MEASURED LEVEL OF UNINTENTIONAL ELECTROMAGNETIC EMISSIONS FROM AN ELECTRONIC DEVICE

[76] Inventor: Larisa Matejic, 820 Central St., Holliston, Mass. 01746

[21] Appl. No.: 164,898
[22] Filed: Dec. 8, 1993
[51] Int. Cl.⁶ .............................. H04L 7/00
[52] U.S. Cl. ..................... 327/113; 327/119; 327/131; 327/134
[58] Field of Search ............ 307/271, 261, 228, 269, 307/263; 327/113, 114, 116, 119, 131, 134

[56] References Cited
U.S. PATENT DOCUMENTS

3,388,349  9/1964  Ault ............................. 332/18
4,507,796  3/1985  Stumfall ....................... 375/106
4,996,684  2/1991  Morley et al. ............... 370/100.1

Primary Examiner—Timothy P. Callahan
Assistant Examiner—T. Lam
Attorney, Agent, or Firm—Iandiorio & Teska

[57] ABSTRACT

A clock system and method for reducing the measured level of electromagnetic emissions, measured by a measuring device employing a C.I.S.P.R. quasi-peak detector from an electronic device having unintentional electromagnetic emissions at frequencies derived from a system clock is achieved by varying the frequency of the system clock in a range between first and second predetermined frequencies to spread the emission energy over the frequency range and reduce measured emission levels.

8 Claims, 7 Drawing Sheets

FIG. 7

CLOCK SYSTEM AND METHOD FOR REDUCING THE MEASURED LEVEL OF UNINTENTIONAL ELECTROMAGNETIC EMISSIONS FROM AN ELECTRONIC DEVICE

FIELD OF INVENTION

This invention relates to a clock system and method for reducing the measured level of unintentional electromagnetic emissions from an electronic device.

BACKGROUND OF INVENTION

Electronic equipment, e.g., computers, printers, plotters, that utilize one or more system clocks to synchronize their various circuits and functions, generate unintentional electromagnetic emissions at frequencies derived from the system clock frequency. Generated electromagnetic emissions, if strong enough can interfere with surrounding electronic equipment. In order to minimize these emission levels to below that which will interfere with neighboring equipment, U.S. and international standards of acceptable levels have been set. The Code of Federal Regulations, 47 C.F.R. 15.35, referring to the international standards of Comité International Spécial des Perturbations Radioélectriques (C.I.S.P.R.) requires that the unintentional electromagnetic emissions be kept below stated levels as measured by equipment employing a C.I.S.P.R. quasi-peak detector with prescribed charge and discharge times. The quasi-peak detector with a 120 kHz receiver bandwidth in the 30–1000 MHz range for radiated emissions centers on the salient radiated emission frequency to measure the emission strength at that frequency. If the measured unintentional electromagnetic emissions exceed prescribed limits, the prototype under test is returned for redesign and then re-testing before it can receive approval for sale and use. The redesign is expensive and time consuming. First customer shipment delay reduces the revenues and may ultimately result in product cancellation. The redesign can involve a solution such as lowering the unintentional electromagnetic emission levels of the equipment by installing a shield around the equipment or selected components or designing and installing additional complex circuitry to suppress the unintentional electromagnetic emissions to acceptable levels.

SUMMARY OF INVENTION

It is therefore an object of this invention to provide an improved clock system and method for reducing the measured levels of unintentional electromagnetic emissions from an electronic device.

It is a further object of this invention to provide such an improved clock system and method which reduces measured unintentional electromagnetic emissions.

It is a further object of this invention to provide such an improved clock system and method which either does not allow time for the quasi-peak detector to fully charge or allows time for the quasi-peak detector to partially discharge or both, and so provides lower measured unintentional electromagnetic emission levels.

It is a further object of this invention to provide such an improved clock system and method which spreads the unintentional electromagnetic emissions over a range of frequencies and so reduces emission levels measured by using the prescribed method.

The invention results from the realization that measured unintentional electromagnetic emissions can be reduced by sweeping the frequency of the system clock and signals derived from it which induce the emissions over a broad range of frequencies so that the quasi-peak detector either does not have time to fully charge during the period when the system clock is operating at the narrow frequency band to which the measuring device is tuned or has time to partially discharge when the system clock is not operating at the narrow frequency band to which the measuring device is tuned, or both. Emissions are spread over the range swept by the system clock instead of concentrated at the one narrow band of frequencies to which the measuring device is tuned for testing.

This invention features a clock system for reducing the level of electromagnetic emissions, measured by a measuring device employing a C.I.S.P.R. quasi-peak detector, from an electronic device having unintentional electromagnetic emissions at frequencies derived from a system clock frequency. There is a variable frequency system clock and means for varying the frequency of the variable frequency system clock in a range between first and second predetermined frequencies to spread the emission energy over the frequency range and reduce measured emission levels.

In a preferred embodiment the system clock may include a voltage controlled oscillator and the means for continuously varying the frequency may include a sawtooth wave generator. The period of variation of the frequency of the system clock may be substantially greater than the period of the system clock to either provide sufficient time to the quasi-peak detector to substantially discharge or not enough time to fully charge, or both.

The invention also features a method of reducing the measured level of radiated electromagnetic emissions, measured by a measuring device employing a C.I.S.P.R. quasi-peak detector from an electronic device having unintentional electromagnetic emissions at frequencies derived from a system clock including varying the frequency of the system clock in a range between first and second predetermined frequencies to spread the emission energy over the frequency range and reduce measured emission levels.

DISCLOSURE OF PREFERRED EMBODIMENT

Other objects, features and advantages will occur to those skilled in the art from the following description of a preferred embodiment and the accompanying drawings, in which.

Figure 1:
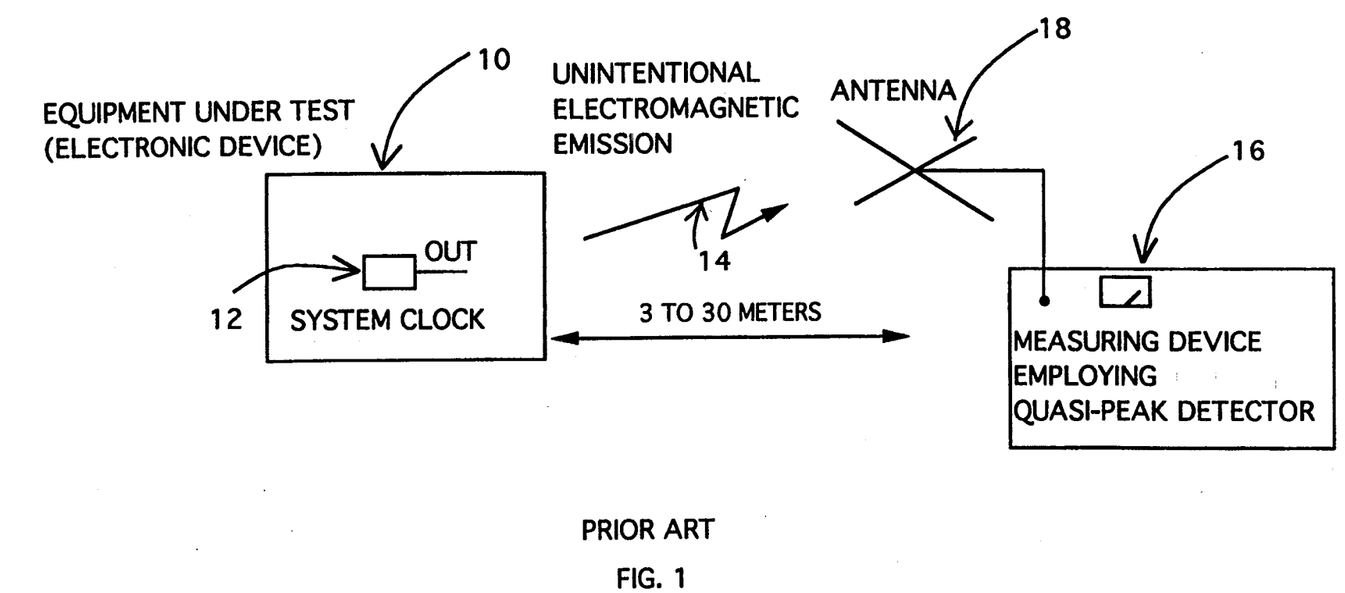
FIG. 1 is a schematic block diagram of a piece of equipment under test for unintentional radiated electromagnetic emission by a measuring device employing a quasi-peak detector in accordance with C.I.S.P.R. and 47 CFR 15.35 regulations.

There is shown in FIG. 1 an electronic device 10 under test such as a computer, printer, plotter, or the like. Device 10 may have one or more system clocks 12 depending upon its design. A system clock is a clock whose signals, either directly or indirectly by being stepped up or stepped down, are used to synchronize other circuits in the device. In accordance with the C.I.S.P.R. Publication 16 and 47 CFR 15.35, a measuring device employing a quasi-peak detector 16 is used to measure the unintentional radiated electromagnetic emissions 14 from device 10. This is accomplished by placing the receiver antenna 18 at a prescribed separation distance of 3 to 30 meters from the device 10 under test. A measuring device employing a quasi-peak detector 16 covers 30 to 1000 MHz with a bandwidth of 120 kHz.

Figure 2:
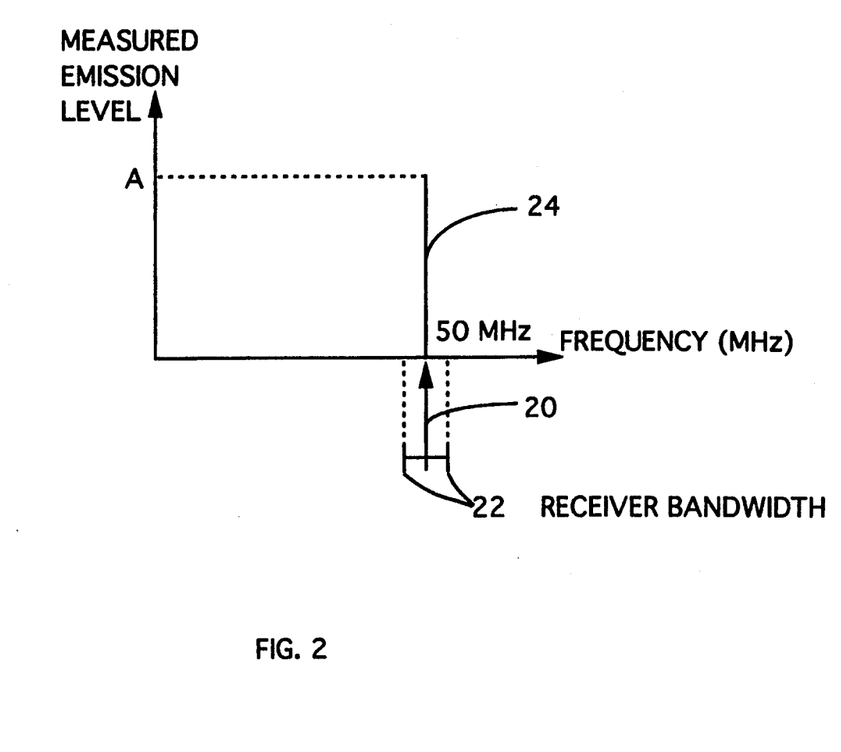
FIG. 2 is an illustration of the frequency domain of the measured unintentional radiated electromagnetic emissions derived from the system clock, FIG. 1, and illustrating the 120 kHz bandwidth utilized by the quasi-peak detector of FIG. 1.
Figure 3:
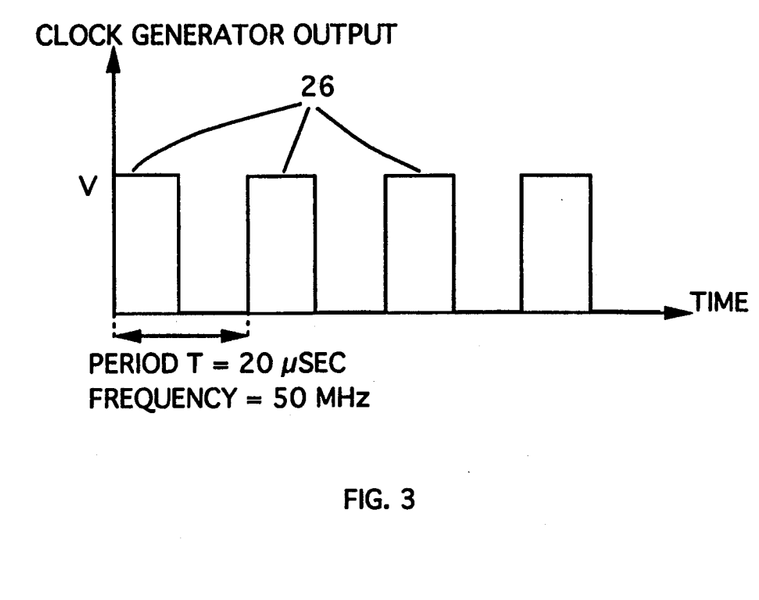
FIG. 3 is an illustration of the time domain of the 50 MHz clock pulse train.

For example, as shown in FIG. 2, a measuring device employing a quasi-peak detector 16 has been tuned to the frequency of 50 MHz as indicated at arrow 20, with a bandwidth of 120 kHz indicated by brackets 22. Vertical bar 24 represents the unintentional radiated electromagnetic emissions at 50 MHz having a measured amplitude A. The system clock signal in time domain appears as shown in FIG. 3, where a train of pulses 26 at 50 MHz have a period T of 20 microseconds and a voltage amplitude V.

Figure 4:
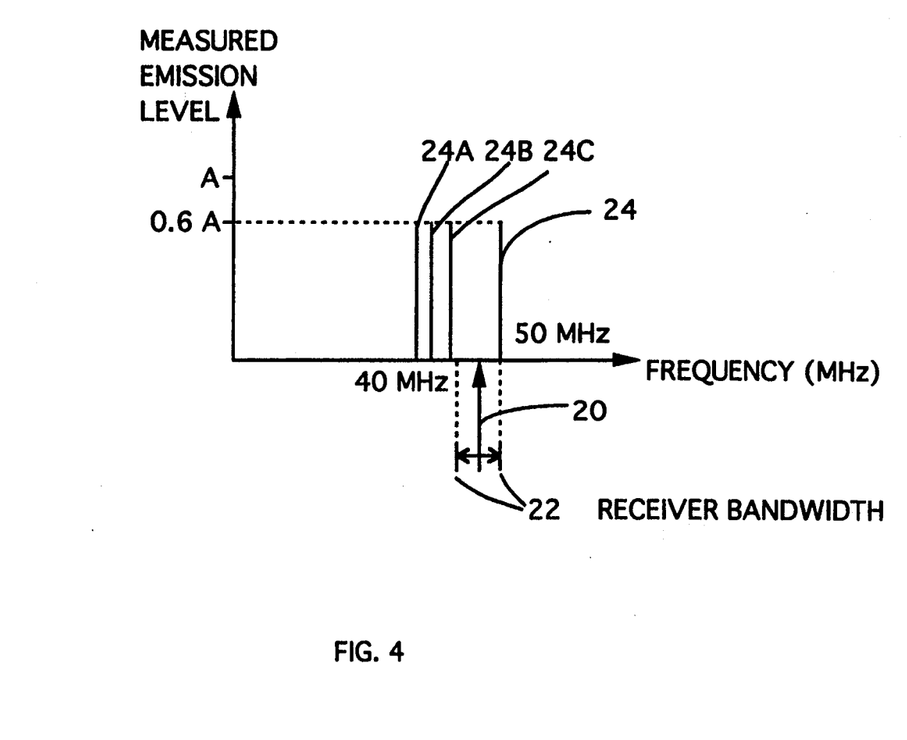
FIG. 4 is an illustration similar to FIG. 2 with the system clock being swept continuously between 40 and 50 MHz.
Figure 5:
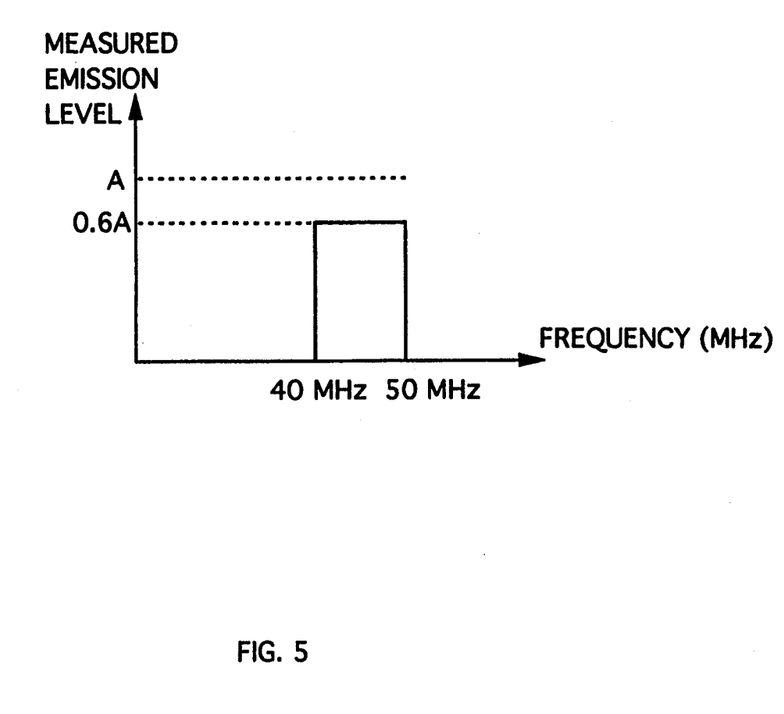
FIG. 5 is an illustration similar to FIG. 2 showing a plausible reduction of the measured radiated electromagnetic field strength when the system clock is swept between 40 and 50 MHz.

In accordance with this invention, in order to give a measuring device employing a quasi-peak detector 16 either less than enough time to fully charge or time to sufficiently discharge or both, the system clock is swept as shown in FIG. 4. As a result of the clock being swept, the radiated emission energy is spread over a broader range of frequencies, thus reducing the measured narrow band emission levels. In the example shown in FIG. 4, the clock frequency is swept continuously in time, from 40 MHz to 50 MHz and back to 40 MHz repeatedly through all the frequencies in between. Thus the system clock according to this invention is only operating within the narrow 120 kHz bandwidth 22 for a very small portion of the time. All the time that it is sweeping from 40 MHz to 49.88 MHz, and from 49.88 MHz back to 40 MHz, a measuring device employing a quasi-peak detector 16 receives no signal since the emitted radiation is outside of the 120 kHz bandwidth centered at 49.94 MHz. This either gives sufficient time to the quasi-peak detector to substantially discharge, or not enough time to fully charge, or both. It also spreads the energy over time through the range of frequencies between 40 and 50 MHz, thereby reducing measured emission levels at narrow band frequencies. Where previously the measured radiated electromagnetic field strength level had an amplitude A as indicated in FIG. 2, these emissions have now been spread over the range of between 40 and 50 MHz, FIG. 5, and has measured radiated electromagnetic field strength of, for example, 0.6 A as indicated in FIG. 4. Thus while a system clock normally has a fixed frequency, often crystal controlled, in accordance with this invention, the system clock is driven so that its frequency varies. This seems counterintuitive since by all definitions the system clock is meant to be a fixed and unvarying reference to which the entire device is synchronized. However, in many computers, printers, plotters, and other kinds of electronic devices there is no harmful effect by varying the frequency of the system clock; the slight slowdown, for example, sweeping from 50 MHz to 40 MHz, would not be noticed in most instances. In some cases it may well not be appropriate, but where it is, this minor excursion from the nominal system clock frequency does not degrade operation of an electronic device and solves a major problem in the area of legally controlled unintentional electromagnetic emissions.

Although in this described embodiment the clock is swept from 50 MHz down to 40 MHz and back again, this is not a necessary limitation of the invention. It is preferred, however, in those situations where the system has been designed to operate at the maximum frequency, for example 50 MHz. In that case errors may occur if the system is operating above that maximum frequency, and so the sweep range will be from that frequency to a lower frequency and back again. However, if this is not a consideration the sweep range can be from the nominal frequency upward and back again to the nominal frequency, or it can be a range which goes both below and above the nominal frequency.

Figure 6:
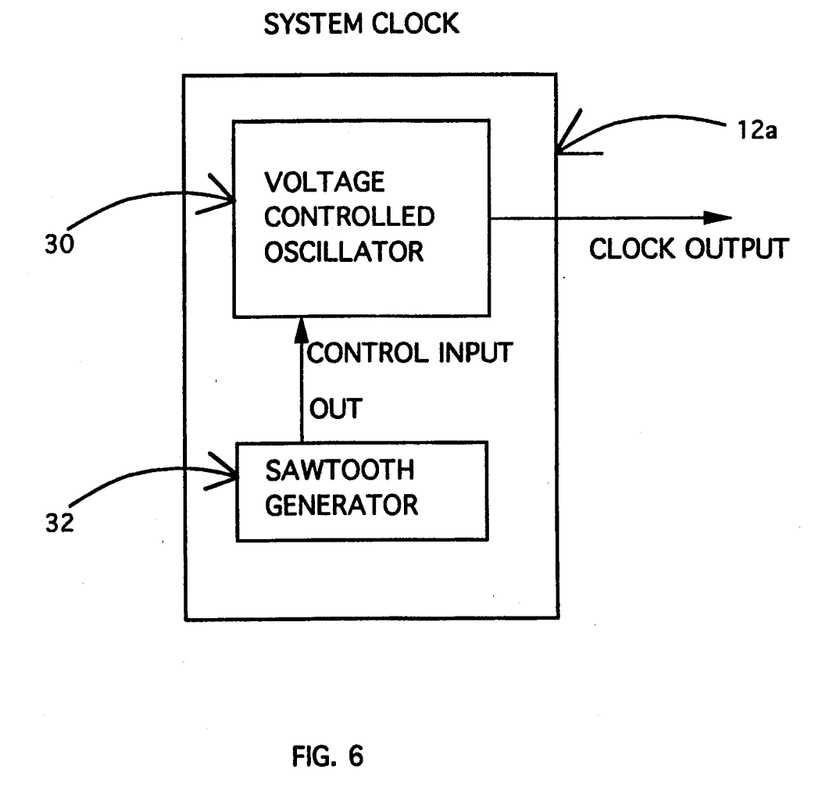
FIG. 6 is a schematic block diagram of one of the possible implementations of a system clock according to this invention.
Figure 7:
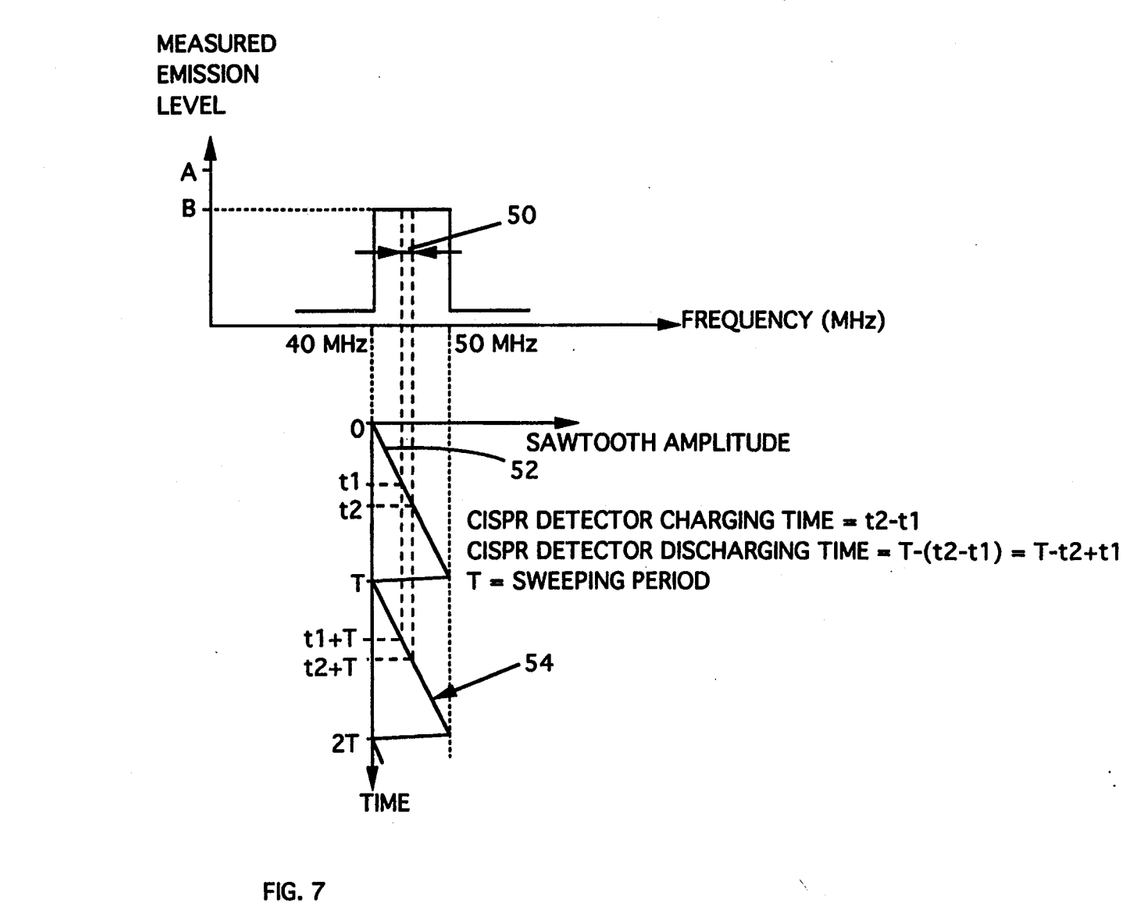
FIG. 7 is a graphical illustration of the sawtooth waveform produced by the sawtooth generator of FIG. 6 used to control the sweeping of the system clock.

In accordance with this invention a system clock 12a, FIG. 6, may include a voltage controlled oscillator (VCO) 30 accompanied by some means for continuously varying in time the frequency of that VCO, such as sawtooth generator 32. The sweeping of the system clock frequency using sawtooth generator 32 is shown graphically in FIG. 7. The bandwidth 50 of the measuring device 16 including the quasi-peak detector is 120 kHz. The system clock has a nominal frequency of 50 MHz and the measuring device 16 employing a quasi-peak detector is set at 45 MHz. The slope 52 of the sawtooth waveform 54 determines the charge time $t_2 - t_1$ during which the quasi-peak detector will charge. The complementary times 0 to $t_1$ and $t_2$ to T define the times during which the quasi-peak detector discharges. By varying the steepness of slope 52, or changing the range over which the clock frequency is swept, the measured emission level can be decreased from, for example, level A to level B. The slope 52 can be increased in steepness by increasing the sawtooth frequency or decreased in steepness by decreasing the sawtooth frequency.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A clock system for reducing the measured level of electromagnetic emissions, measured by a measuring device employing a C.I.S.P.R. quasi-peak detector tuned to a narrow band frequency range, from an electronic device having unintentional electromagnetic emissions at frequencies derived from the system clock frequency, comprising:

a variable frequency system clock; and
   means for varying the frequency of said variable frequency system clock in a range between first and second predetermined frequencies such that the system clock is operating outside the narrow band frequency range for a time period substantially greater than the time period the system clock is operating in the narrow band frequency range to spread the emission energy over the frequency range and reduce the measured electromagnetic emission levels at the narrow band frequency range to which the measuring device is tuned.

2. The clock system of claim 1 in which said system clock includes a voltage controlled oscillator.

3. The clock system of claim 1 in which said means for varying the frequency includes a sawtooth wave generator.

4. The clock system of claim 1 in which the time period of the system clock operating outside the narrow band frequency range is of a long enough duration to provide sufficient time for the measuring device, the C.I.S.P.R. quasi-peak detector, to substantially discharge.

5. A clock system for reducing the measured level of electromagnetic emissions, measured by a measuring device employing a C.I.S.P.R. quasi-peak detector tuned to a narrow band frequency range, from an electronic device having unintentional electromagnetic emissions at frequencies derived from the system clock frequency, comprising:

a variable frequency system clock; and means for varying the frequency of said variable frequency system clock in a range between first and second pre-determined frequencies such that a time period that the system clock is operating in the narrow band frequency range is of short enough duration to spread the emission energy over the frequency range and reduce the measured electromagnetic emission levels at the narrow band frequency range to which the measuring device is tuned.

6. The clock system of claim 5 in which said system clock includes a voltage controlled oscillator.

7. The clock system of claim 5 in which said means for varying the frequency includes a sawtooth wave generator.

8. The clock system of claim 5 in which the time period of the system clock operating in the narrow band frequency range is of short enough duration to provide insufficient time for the measuring device, the C.I.S.P.R. quasi-peak detector, to substantially charge.

* * * * *